United States Patent

[11] 3,556,497

| | | |
|---|---|---|
| [72] | Inventor | Hugh Willmott Grenfell<br>Glamorgan, South Wales, England |
| [21] | Appl. No. | 704,919 |
| [22] | Filed | Feb. 12, 1968 |
| [45] | Patented | Jan. 19, 1971 |
| [73] | Assignee | The Steel Company of Wales Limited<br>Glamorgan, South Wales,<br>a British Company |
| [32] | Priority | Dec. 15, 1967 |
| [33] | | Great Britain |
| [31] | | No. 57158/67 |

[54] LANCE WITH VENTURI OXYGEN NOZZLE
6 Claims, 1 Drawing Fig.

[52] U.S. Cl................................................ 266/34,
239/132.3
[51] Int. Cl...................................................... C21c 7/00
[50] Field of Search............................................ 266/34.1;
239/132.3

[56] References Cited
UNITED STATES PATENTS
3,043,577 7/1962 Berry............................ 239/132.3
3,313,535 4/1967 Hopkins....................... 266/34(.1)X FOREIGN PATENTS
888,634 1/1962 Great Britain................ 266/34(.1)
220,174 3/1962 Austria......................... 266/34(.1)

Primary Examiner—J. Spencer Overholser
Assistant Examiner—John S. Brown
Attorney—Krafft and Wells ABSTRACT: A lance for use in steel refining apparatus comprising a body having concentric fuel and oxygen supply conduits each communicating near the nozzle end of the lance with a plurality of oxygen and fuel supply pipes respectively which terminate at an angle to a longitudinal axis of the lance, said pipes including means for accelerating gas flow in the oxygen supply pipes whereby fuel is entrained by an oxygen stream emitted from the oxygen supply pipe at the nozzle end of the lance at a speed approaching sonic velocity. The lance is particularly adapted for use in a steel refining process in which a flame fed by streams of fuel oil and oxygen is introduced into a converter vessel so that the products of combustion but not the flame impinge upon the melt.

PATENTED JAN 19 1971
3,556,497
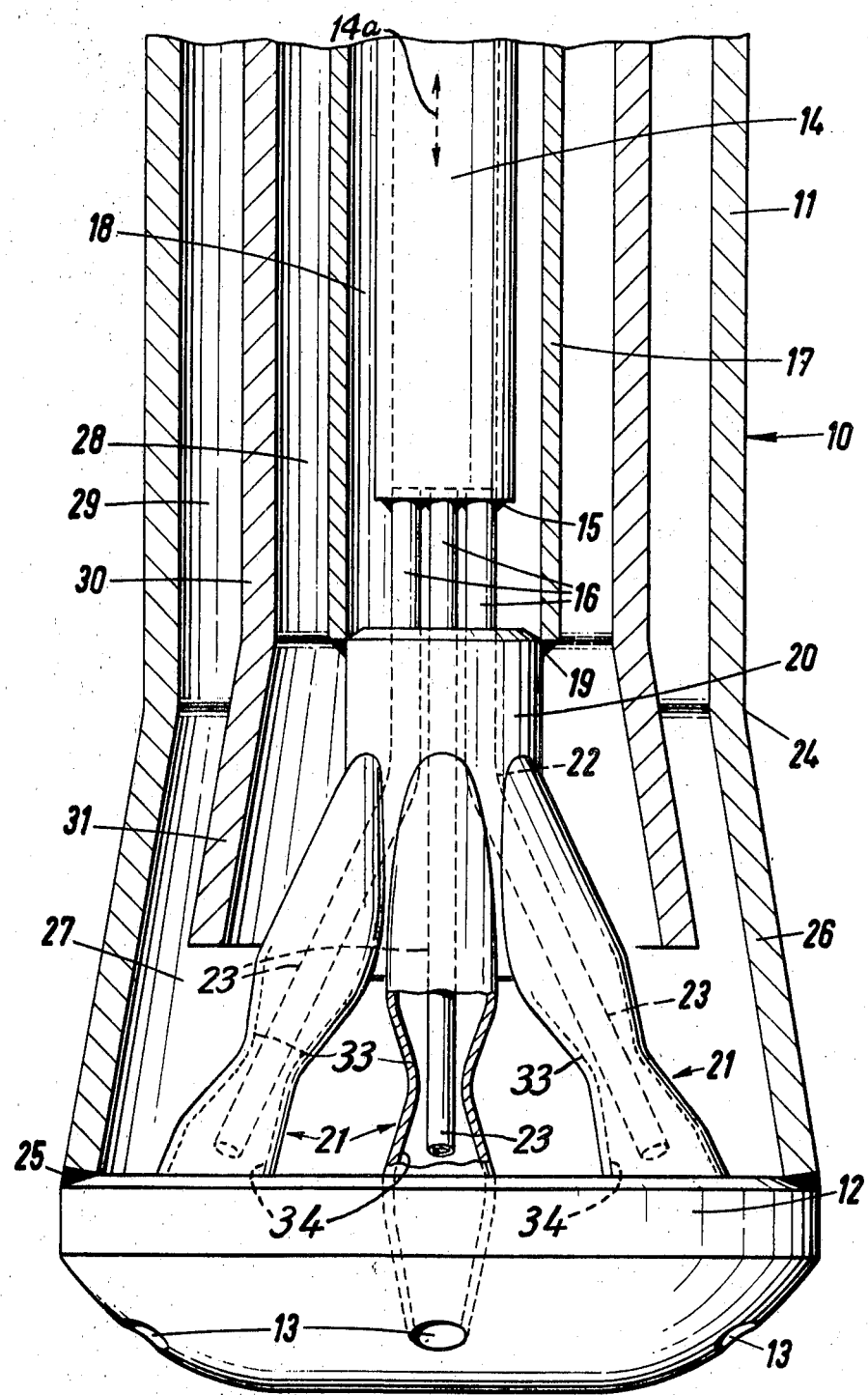
INVENTOR
Hugh Willmott Grenfell
BY
Krafft & Wells
ATTORNEYS

LANCE WITH VENTURI OXYGEN NOZZLE

This invention relates to steel manufacture and particularly to apparatus for the injection of oxygen or other fluids (hereinafter referred to as oxygen) into steel refining apparatus, such as an open hearth furnace or a top blown converter. The invention is also concerned with the provision of a multipurpose lance which may be used not only for the injection of oxygen into steel refining apparatus but which may also be used as a burner whereby fuel oil may be mixed with the oxygen supply to provide a heating flame which can be used, for example for the preheating or melting of the initial charge of scrap in the converter.

The present invention has for its object to provide an improved multipurpose lance for the injection of oxygen or fuel oil and oxygen, which is greatly simplified in construction and which is also easily adjustable so as to give a certain amount of control over the flame.

According to the present invention, there is provided a lance for use in steel refining apparatus, which lance comprises an elongate body member having a fuel supply conduit centrally located therein and an oxygen supply conduit surrounding said fuel supply conduit to provide an annular passageway for the supply of oxygen, wherein the body member is provided with a delivery nozzle at one end thereof formed with a plurality of discharge orifices communicating with said oxygen supply conduit through a plurality of oxygen supply pipes disposed at an angle to the longitudinal axis of the lance and incorporating means for accelerating gas flow in said oxygen supply pipes and wherein the fuel supply conduit is provided at its outlet end with a plurality of fuel supply pipes extending therefrom and each having its end portion situated in a corresponding oxygen supply pipe so that oxygen flowing in said supply pipes to the discharge orifices will first flow in an annulus around the end of the corresponding fuel supply pipe whereby fuel will be entrained in the supplied oxygen when discharged from the discharge orifices. The arrangement is such that the central fuel conduit is movable in and out relative to the elongate body member of the lance as shown by arrow 14a so that the fuel supply pipes may be adjusted in position in the oxygen supply pipes extending from the main oxygen supply conduit. This arrangement gives the operator a certain amount of flame control and adjustment for the lance.

In one embodiment of the present invention, the lance is intended for use with fuel oil and the body member is provided with cooling means in the form of annular passageways surrounding the fuel and oxygen supply conduits. Preferably the cooling fluid passes downwardly through an annular passageway surrounding the oxygen supply conduit to the delivery nozzle of the lance and then returns upwardly through an outer annular passageway located in the lance adjacent the outer surface thereof.

The means for accelerating gas flow in said oxygen supply pipes may comprise a venturi, the area of throat being determined by the speed required for oxygen leaving the nozzle. It is preferred that the oxygen should leave the nozzle at extremely high velocity and preferably somewhere in the region of Mach 1.7. The high oxygen velocity has the advantage of ensuring good mixing between the oxygen and the fuel and in fact liquid fuels are atomized by an oxygen stream having this velocity. This results in a short flame and the products of combustion have a very high velocity.

A typical construction of venturi for inclusion in a lance in accordance with the present invention can be considered wherein the oxygen velocity in the throat of the venturi is to be sonic, that is to say, 1,037 ft. per second.

The area of the throat in square feet is given by the following formula:

$$\text{Area} = \frac{\text{Flow of oxygen (cu. ft. per sec.)}}{1,037} + \text{Area of Fuel pipe.}$$

The cross section therein of the fuel pipe will depend on the flow of oil or gas to be supplied to the burner.

Thus, in a typical embodiment it would be preferred that the opposite walls on the converging section of each venturi would make an angle of about 26° with each other, or 13° with the longitudinal axis of the oxygen supply pipe. With this construction, the velocity of the exit gases would then be approximately:

$$1{,}037 \bigg/ \left[ 6 \left( 1 - \left( \frac{14.7}{\text{Ogygen Pressure}} \right)^{0.286} \right) \right] \text{ft./sec.}$$

The burner may comprise any number of oxygen supply pipes in the nozzle associated therewith, although usually 3 or 6 are employed. The oxygen supply pipes may be inclined at any angle to the axis of the lance but preferably at an angle within the range 7 to 25°.

The invention will now be described by way of example with reference to the accompanying drawing, the single FIG. of which is a part sectional elevation of the lower part of a multipurpose lance in accordance with the invention.

In the embodiment as shown in the drawing the multipurpose lance 10 comprises an elongate body member 11 which is provided with a combined delivery and burner nozzle 12 at the lower end thereof. The interior of the body member 11 of the lance 10 is built up of a number of annular passageways or conduits by which oxygen and fuel oil are supplied through converging portions of the passageways to a plurality of discharge orifices 13 formed in the combined delivery and burner nozzle 12. A fuel oil supply conduit comprising a copper pipe 14 is preferably located centrally of the body member 11 of the lance 10. A plurality of fuel supply pipes 16 are welded as at 15 to the lower end of conduit 14 and extend downwardly therefrom, fuel pipes 16 corresponding in number to the number of discharge orifices 13 as will be hereinafter described.

An oxygen supply conduit comprises a pipe 17 forming an annular passageway 18 around the oil supply conduit 14 to permit the free flow of oxygen downward toward the combined delivery and burner nozzle 12 of the lance. The lower end of the oxygen supply conduit 17 extends beyond the lower end of the oil supply conduit 14, so that a portion of each of the fuel oil supply pipes 16 is located within the oxygen supply conduits 17. The lower end of the oxygen supply conduit 17 is connected, for example by welding as at 19, to a discharge head 20 from which extends a plurality of oxygen supply pipes 21 located at an angle of 7 to 25° to the main longitudinal axis of the lance.

In the preferred arrangement the lance 10 is provided with six discharge orifices 13 and the oxygen supply conduit 17 is provided with six corresponding supply pipe lines 21 which converge to discharge orifices 13 for the simultaneous discharge of six streams of oxygen at an angle to the longitudinal axis of the lance. The oil supply pipes 16 which extend downwardly from the lower end of the main oil supply conduit 14 extend in a cluster into the discharge head 20 of the oxygen supply pipe 17 and are then bent outwardly at 22 so that their outer ends 23 are each located in a corresponding oxygen supply pipe 21. The arrangement is such that the six streams of oxygen pass through the corresponding supply pipes 21 to the discharge orifices 13 in the form of annular streams around the ends 23 of the oil supply pipes 16. The movement of the oxygen through the supply pipes 21 to the discharge orifices 13 ensures the entrainment of the fuel oil in the streams of oxygen when the lance 10 is being used as a burner.

Each of oxygen supply pipes 21 incorporates a venturi 32 the throat of which is disposed intermediate the point of communication of supply pipe 21 with the oxygen supply conduit 17 and the discharge orifice 13 of supply pipe 21. Each venturi has its throat disposed rearwardly of the discharge point of the fuel pipe located in the oxygen supply pipe 21 to provide maximum gas velocity passed the end of the fuel pipe 23 debouching within supply pipe 21.

The venturi serves to accelerate the oxygen supplied through supply pipe 21 to a sonic velocity with a result that fuel leaving the end of the pipe 23 disposed within pipes 21 is atomized by the sonic flow of oxygen gas passing the end of the pipe to produce intimate mixing of the fuel and oxygen prior to combustion externally of the lance after leaving nozzle orifices 13.

The main oil supply conduit 14 is mounted for movement within the body member 11 of the lance 10 so that it can be adjusted upwardly or downwardly along the longitudinal axis of the lance. In this way the position of the ends 23 of the oil supply pipes 16 in the oxygen supply pipes 21 can be varied and this gives a certain amount of flame adjustment for the lance 10 and when it is being used as a burner.

The outer casing which forms the body 11 of the lance extends around the oxygen supply conduit 17 and is flared outwardly at its lower end as at 24 to accommodate the outwardly directed oxygen supply pipes 21. The discharge and burner nozzle 12 is welded as at 25 to the flared outer end 26 of the outer casing of the body 11 of the lance and this nozzle 12 is dome shaped in construction and is provided as previously mentioned with the six spaced discharge orifices 13 to which the oxygen supply pipes 21 communicate.

The annular space 27 provided between the outer casing of the elongate body member 11 of the lance 10 and the outer surface of the oxygen supply conduit 17 is conveniently used for the supply of cooling fluid such as water. To this end the space is divided into two annular passageways 28, 29 by a further annular conduit 30 and the cooling water flows downwardly in passageway 28 through the elongate body member 11 around the outer surface of the oxygen supply conduit 17 into the discharge burner nozzle 12 of the lance and then returns upwardly through the annular passageway 29 formed adjacent the outer casing of the lance. The lower end 31 of conduit 30 is also flared outwardly to accommodate the oxygen supply pipes 21.

It will be appreciated that the invention provides a greatly simplified construction of lance which may be used for the injection of oxygen into steel refining apparatus, but which may also be used as a burner whereby fuel oil may be mixed with the oxygen supply. In the operation of the lance as a burner, fuel oil is supplied and is ejected into the oxygen streams as required. Obviously the supply of fuel oil can be carefully controlled so as to ensure complete combustion and the arrangement may be used for providing a heating flame for the preheating or melting of scrap, for example in a converter. Furthermore, the invention provides for the adjustment of the oil supply conduit so that further control and adjustment of the flame can be obtained. At any time by suitably cutting off the supply of fuel oil the lance will immediately continue to operate as an oxidizing lance whereby oxygen is supplied through the delivery orifices in the form of a multijet oxygen lance. The lance has particular application in a basic oxygen converter and it is believed that its use may increase the life of the furnace and also reduce operating costs.

I claim:

1. A lance for use in steel refining apparatus, which lance comprises an elongate body member having a fuel supply conduit centrally located therein and an oxygen supply conduit surrounding said fuel supply conduit and forming an annular passageway for the supply of oxygen, wherein the body member is provided with a delivery nozzle at one end thereof formed with a plurality of discharge orifices communicating with said oxygen supply conduit through a plurality of oxygen supply pipes disposed at an angle to the longitudinal axis of the lance, each of said oxygen supply pipes having a converging portion adjacent the extremity of each oxygen supply pipe which converging portion is of decreasing cross section in the direction of oxygen flow, and incorporating means for accelerating gas flow in said oxygen supply pipes, said fuel supply conduit being provided at its outlet end with a plurality of fuel supply pipes extending therefrom and each having its end portion axially situated in a corresponding oxygen supply pipe at the converging portion thereof whereby oxygen flowing from said supply pipes to the discharge orifices will flow in an annulus around the end of the corresponding fuel supply pipes and whereby fuel discharged from the ends of the fuel supply pipes is carried from the discharge orifices and entrained in the oxygen supplies when discharged from the discharge orifices.

2. A lance as claimed in claim 1 wherein the central fuel conduit is movable along the longitudinal axis of the lance relative to the oxygen supply conduit, so that fuel supply pipes can be adjusted in position in the oxygen supply pipes.

3. A lance as claimed in claim 2 wherein the body member is provided with cooling means in the form of annular passageways surrounding the oxygen supply conduits.

4. A lance as claimed in claim 1 wherein the means for accelerating gas flow in the oxygen supply pipes comprises a venturi, the area of the throat of said venturi being determined by the speed required for oxygen leaving the nozzle.

5. A lance as claimed in claim 1 wherein the end portions of the fuel supply pipes are essentially unobstructed tubes.

6. A lance as claimed in claim 1 wherein each oxygen supply pipe includes a venturi section in advance of the converging portion of the oxygen supply pipe which is adjacent the discharge orifice thereof.